(12) United States Patent
Tanaka et al.

(10) Patent No.: US 7,648,174 B2
(45) Date of Patent: Jan. 19, 2010

(54) HOSE ASSEMBLY WITH CLAMP, AND BAND HOLDER

(75) Inventors: Kazuki Tanaka, Hiroshima (JP);
Hidenobu Fuji, Hiroshima (JP);
Teruhiko Tokoshima, Hiroshima (JP);
Tatsunori Iwasaki, Hiroshima (JP)

(73) Assignee: NIFCO Inc., Yokohama-Shi, Kanagawa (JP)

( * ) Notice: Subject to any disclaimer, the term of this patent is extended or adjusted under 35 U.S.C. 154(b) by 1 day.

(21) Appl. No.: 12/071,194

(22) Filed: Feb. 19, 2008

(65) Prior Publication Data
US 2008/0209690 A1 Sep. 4, 2008

(30) Foreign Application Priority Data
Feb. 19, 2007 (JP) .............................. 2007-037730

(51) Int. Cl.
*F16L 33/00* (2006.01)
(52) U.S. Cl. ........................................ 285/23; 285/253
(58) Field of Classification Search ................... 285/23, 285/420, 252, 253
See application file for complete search history.

(56) References Cited

U.S. PATENT DOCUMENTS

| | | | | |
|---|---|---|---|---|
| 4,592,575 A | * | 6/1986 | Hughes et al. | 285/252 |
| 4,753,459 A | * | 6/1988 | Potier | 285/23 |
| 5,002,094 A | * | 3/1991 | Brovont | 285/23 |
| 5,234,233 A | * | 8/1993 | Fix | 285/23 |
| 5,350,201 A | * | 9/1994 | Bynum | 285/92 |
| 5,616,205 A | * | 4/1997 | Cogdill et al. | 285/252 |
| 5,915,739 A | * | 6/1999 | Cradduck et al. | 285/252 |
| 6,343,772 B1 | * | 2/2002 | Oi | 285/23 |
| 6,695,354 B2 | * | 2/2004 | Brockmann et al. | 285/23 |
| 6,701,581 B2 | * | 3/2004 | Senovich et al. | 285/252 |
| 7,347,454 B2 | * | 3/2008 | Martus | 285/23 |
| 7,427,083 B2 | * | 9/2008 | Pina et al. | 285/23 |

* cited by examiner

*Primary Examiner*—David E Bochna
(74) *Attorney, Agent, or Firm*—Manabu Kanesaka (57) ABSTRACT

A band holder holds a clamp band for a hose. The band holder includes an arm for covering an outer peripheral portion of the hose, connecting portions provided at free ends of the arm for connecting the free ends to form a circular shape of the arm, and a holding portion projecting from the arm for holding the clamp band. A fixing device fixes at least the holding portion to the hose. A hose assembly includes the band holder, a flexible hose to be connected to a tubular member, and a clamp band covering an outer surface of the hose for connecting the hose to the tubular member. The clamp band includes a band portion, and a screw unit provided at ends of the band portion for a clamp operation so that the screw unit tightens the band portion.

12 Claims, 12 Drawing Sheets

HOSE ASSEMBLY WITH CLAMP, AND BAND HOLDER

BACKGROUND OF THE INVENTION AND RELATED ART STATEMENT

The invention relates to a hose assembly with clamp and band holder.

When a flexible hose is fitted from the outside into a tube portion of the other part, a clamp band is used. For example, the clamp band disclosed in Japanese Patent Publication (TOKKAI) No. 2003-314771 includes a belt-like band portion and a screw unit provided in an end portion of the band portion. The screw unit includes an endless screw and a screw bearing rotatably holding the endless screw. On the other hand, the outer peripheral surface of the band portion forms inclined screwing portions which are screwed into the endless screw. Moreover, the screw bearing forms a through-bore assuring the fitting between the endless screw and the inclined screwing portions by inserting the other end portion of the band portion. Then, by binding the band portion to the outer periphery of the hose, inserting the other end portion into the through-bore, and rotating the endless screw, a clamp operation of the hose is conducted.

Incidentally, in the hose disclosed in Japanese Unexamined Patent Publication (TOKKAI) No. H4-157285, in order to prevent the above-mentioned clamp band from being disengaged from the hose, circular ribs are provided on end portions of the hose as a pair of back and front ribs and the clamp band is placed between both ribs.

However, in the hose manufactured by an extrusion molding such as an air intake hose and the like which form the air intake channels of an engine, it was difficult to form the ribs, such as the ribs described in Japanese Unexamined Patent Publication (TOKKAI) No. H4-157285, on the end portions. On the other hand, a process for tightening the clamp band which is bound to the air intake hose is conducted in the last assembly stage of the engine, so that it is difficult to see the clamp band due to a wire harness or a small hose and the like wherein the clamp band is provided in the engine. Therefore, the clamp band sometimes was defectively fixed in a state of being diagonally displaced, so that mis-assembly of the clamp band could not be checked during an operation.

This invention has been made in order to solve the above-mentioned problem, and the object of the invention is to provide an inexpensive hose assembly with clamp and band holder which can reliably prevent the mis-assembly even under a less-visible operation environment when the hose manufactured by the extrusion molding is installed to the other member by the clamp band.

Further objects and advantages of the invention will be apparent from the following description of the invention.

SUMMARY OF THE INVENTION

In order to solve the above-mentioned problems, a hose assembly with clamp of the present invention provides a flexible hose which is installed from the outside into a tube member of the other part; and a clamp band which is bound around the outer periphery of the outside fitting portion of the hose. The clamp band includes a belt-like band portion; and a screw unit provided at the end portion of the band portion for a clamp operation which makes the band portion circular and tightens the band portion. The band holder holding the clamp band to the hose is provided as a separate member from the hose. The band holder includes an arm portion which is bound around the outer peripheral portion of the hose; a connecting portion provided at the free end of the arm portion and connecting the arm portion which is bound around the outer peripheral portion of the hose so as to have no end portion of the arm portion; a holding portion projecting from the arm portion and preventing the clamp band from being displaced in a direction of a central line of a hose in a state where a clamp operation of the band portion is possible; and fixing means for fixing at least the holding portion into the hose.

In the embodiment, the band holder holding the clamp band to the hose is provided as the separate member from the hose, so that even in the hose manufactured by an extrusion molding, the clamp band can be held without providing a special extrusion molding process to the hose itself. Also, the band holder binds the arm portion around the hose and connects the free end of the arm portion by the connecting portion, so that the band holder can be easily installed to the hose. Moreover, the holding portion projecting from the arm portion prevents the clamp band from being displaced in the direction of the central line of the hose, so that the clamp band can be reliably prevented from displacement or disengagement in a state where the clamp operation (operation for reducing the radius of the circular-shaped band portion and tightening the hose, or for expanding the radius of the circular-shaped band portion and releasing the clamp) of the clamp band is possible. In addition, at least the holding portion is fixed to the hose by the fixing means, so that the band holder itself can be prevented from the disengagement or the displacement, and the clamp band can be held more reliably.

In the preferred embodiment, the band holder is placed on an inner back side of the clamp band in the direction of the central line of the hose. In this embodiment, the clamp band can be placed on the tip of the hose as close as possible. As a result, the clamp in the direction of the central line of the hose can be set as short as possible, and an extra built-in operation can be omitted.

In the preferred embodiment, the band holder is made of a resin molded product, and the arm portion is elastically bound relative to the hose. In the embodiment, the band holder can be fixed to the outer periphery of the hose by a necessary and sufficient tightening force. More specifically, in the case wherein the band holder is fixed to the flexible hose by an overly strong tightening force, while the holding force of the clamp band increases, an operation, wherein the hose is installed from the outside to a pipe member of the other part, becomes difficult. On the other hand, if the tightening force of the band holder is too weak, capabilities to hold the band holder itself become weak. Therefore, by elastically binding the arm portion around the outer periphery of the hose, the band holder can be attached to the hose by the necessary and sufficient tightening force.

In the preferred embodiment, the arm portion is formed in a corrugated plate shape in such a way of undulating in the radius direction viewed from the direction of the central line of the hose. In the embodiment, the band holder can be manufactured by a relatively simple molding technology.

In the preferred embodiment, the arm portion is formed in a shape meandering in the direction of the central line of the hose. In this embodiment, the band holder can be manufactured by a relatively simple molding technology.

In the preferred embodiment, the middle portion of the band portion is attached to the hose. In the embodiment, the screw unit of the clamp band is prevented from being displaced in a circumferential direction of the hose, and even under a less-visible operational environment, the screw unit of the clamp band can be accurately operated.

In the preferred embodiment, the fixing means is an adhesion layer formed between the surface of the hose and the band holder. In the embodiment, the fixing means can be completed by an adhesive, so that the hose can be easily attached and also the band holder can improve the capabilities to hold the hose.

In the preferred embodiment, the fixing means is a projection projected in the band holder and inwardly projecting in a radius direction of the hose during installation. In the embodiment, when the band holder is attached to the hose, the capabilities of the band holder to hold the hose can be improved.

In the preferred embodiment, the holding portion includes through-band portions which are a pair and located in a position to hold both sides of the screw unit of the band portion during assembly. In the embodiment, the pair of through-band portions can prevent the screw unit of the clamp band from being displaced in the circumferential direction, so that the clamp operation under the less-visible operational environment is facilitated.

Another embodiment of the invention is a band holder for holding the clamp band of the hose assembly with clamp to the hose. The hose assembly with clamp provides the flexible hose which is installed from the outside to the tube member of the other part, and the clamp band which is bound to the outer periphery of the outside fitting portion of the hose. The clamp band includes a belt-like band portion, and the screw unit provided in the end portion of the band portion for the clamp operation which makes the band portion circular and tightens. The band holder is provided as the separate member from the hose. The band holder includes the arm portion which is bound to the outer peripheral portion of the hose, the connecting portion provided in the free end of the arm portion and connecting the arm portion which is bound to the outer peripheral portion of the hose so as to have no end portion of the arm portion, a holding portion projecting from the arm portion and preventing the clamp band from being displaced in the direction of the central line of the hose in a state where the clamp operation of the band portion is possible, and the fixing means fixing at least the holding portion into the hose.

As explained above, the invention can hold the clamp band without any special molding processes to the hose itself, with an inexpensive structure. Also, when the hose manufactured by the extrusion molding is installed from the outside to the other member by the clamp band, mis-assembly can be reliably prevented even under the less-visible operational environment.

BRIEF DESCRIPTION OF THE DRAWINGS

FIGS. 5(A) and 5(B) are overall views of a clamp band according to the embodiment, wherein

DETAILED DESCRIPTION OF PREFERRED EMBODIMENTS

Hereunder, preferred embodiments of the present invention will be explained with reference to the accompanying drawings.

Figure 1:
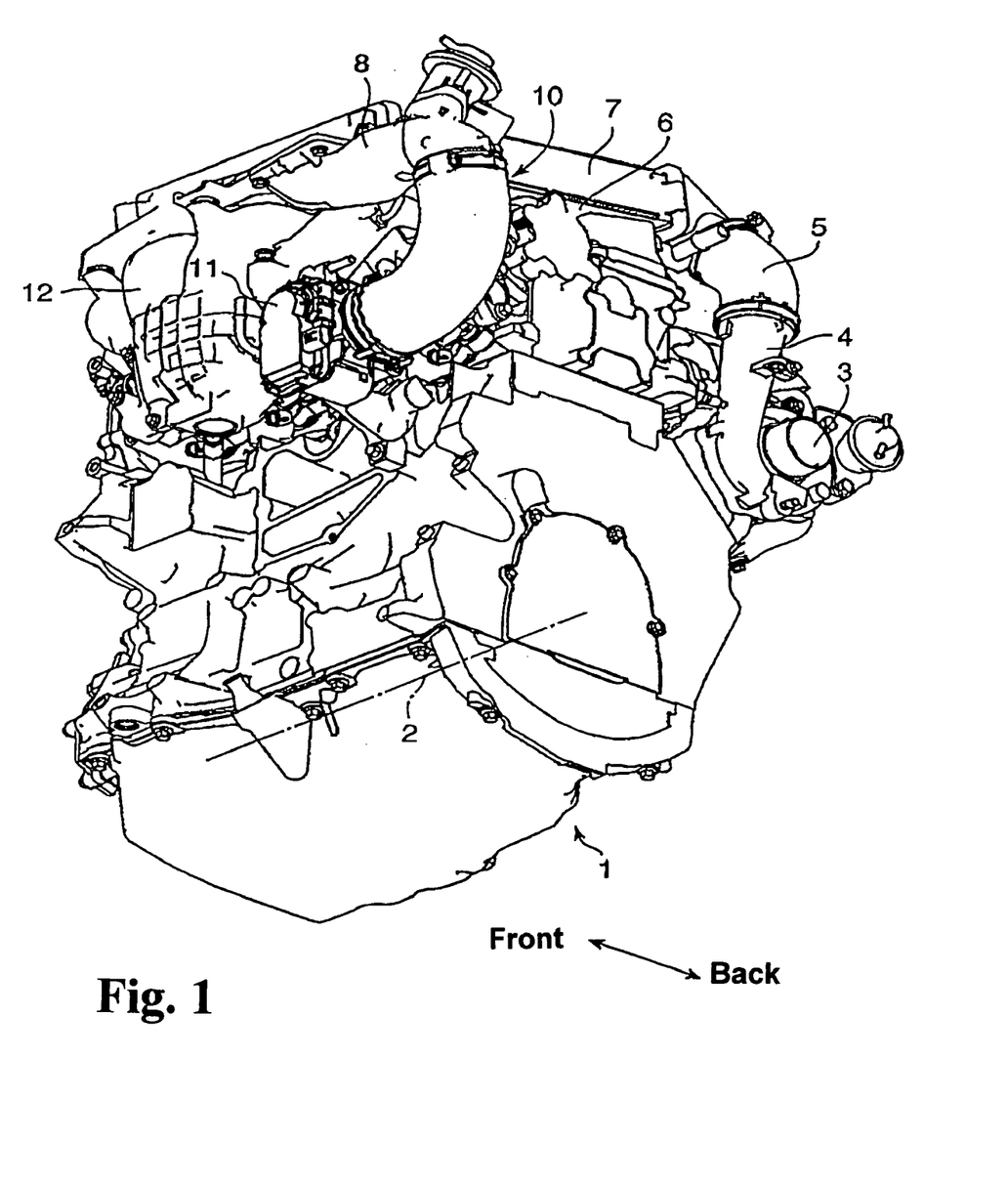
FIG. 1 is a perspective view of an engine adopting a hose assembly with clamp according to an embodiment of the invention.
Figure 2:
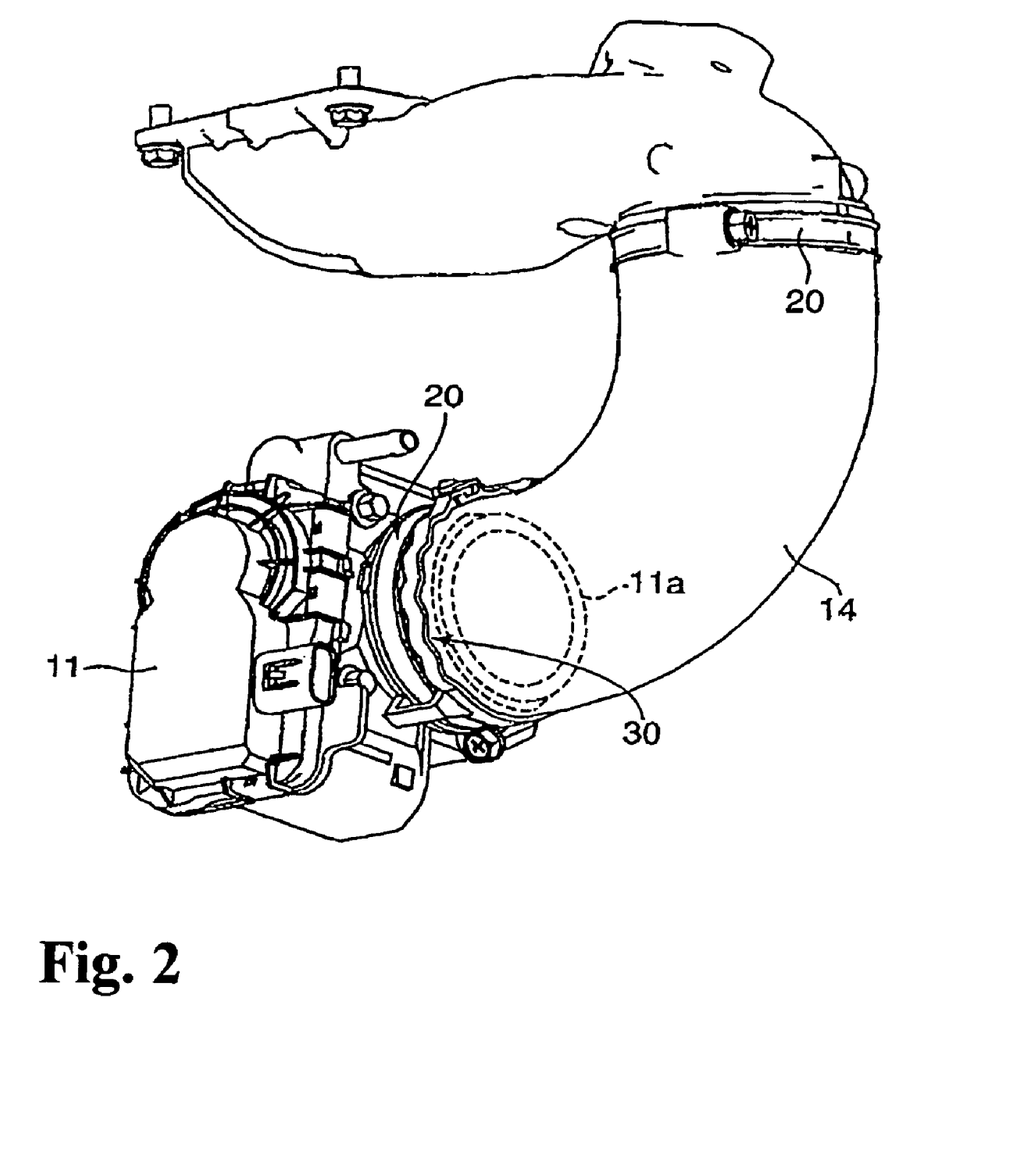
FIG. 2 is a perspective view of the hose assembly with clamp.
Figure 3:
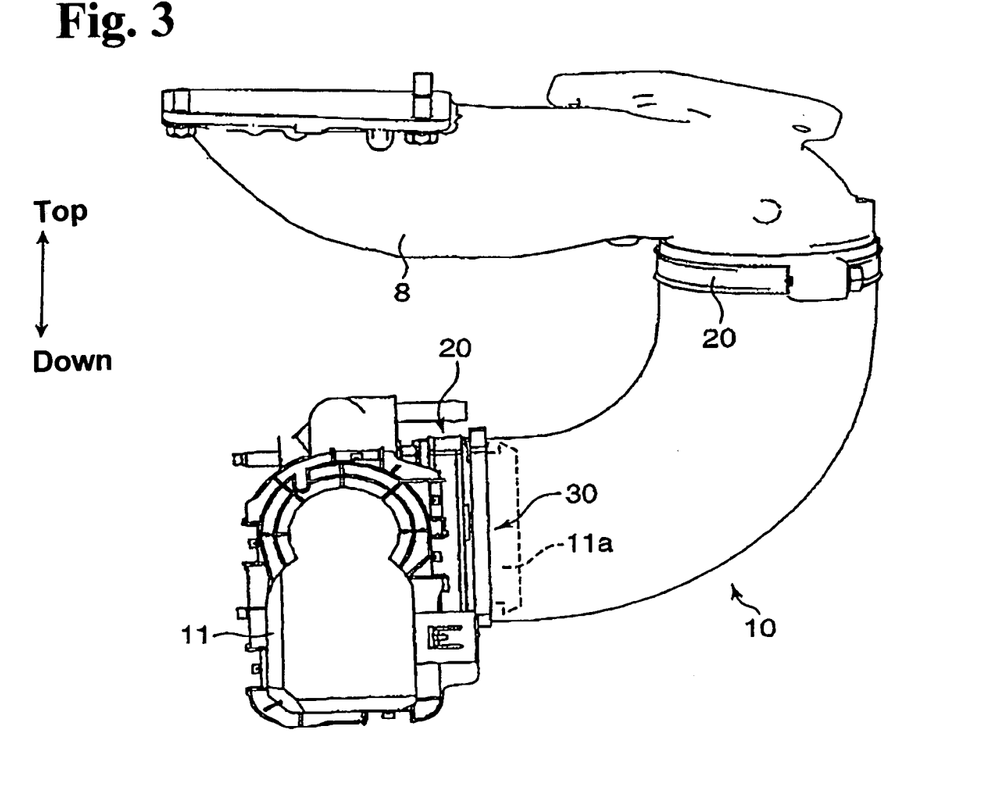
FIG. 3 is a front view of the hose assembly with clamp.
Figure 4:
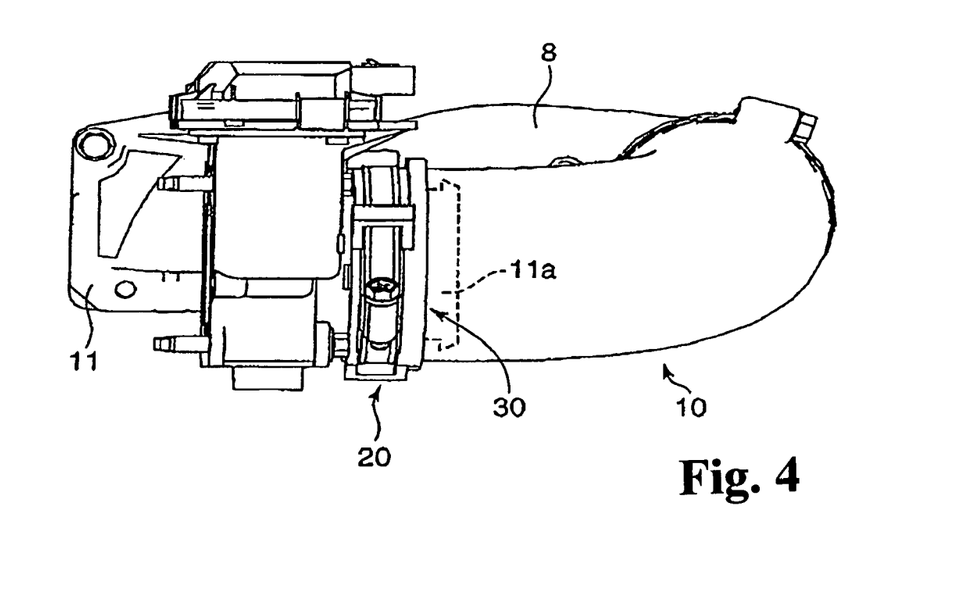
FIG. 4 is a bottom plan view of the hose assembly with clamp.

FIG. 1 is a perspective view of an engine 1 adopting a hose assembly with clamp 10 according to an embodiment of the invention; FIG. 2 is a perspective view of the hose assembly with clamp 10; FIG. 3 is a front view of the hose assembly with clamp 10; and FIG. 4 is a bottom plan view of the hose assembly with clamp 10. Incidentally, in the following explanation, the side where an inlet system is placed is considered as a front side in an orthogonal direction relative to a clamp shaft 2 (shown by only a center line) of the engine 1 in a plan view.

First, with reference to FIG. 1, the engine 1 includes a turbocharger 3 on the back face side. An air introductory part 4 on a compressor side of the turbocharger 3 is connected to an intercooler 7 placed on the top of a cylinder head 6 through a hose 5. The intercooler 7 is connected to the hose assembly with clamp 10, which is an essential feature of the invention, through a duct 8 placed in front of the engine 1. The intercooler 7 is connected to a slot body 11 through the hose assembly with clamp 10, and new air is supplied from the slot body 11 to an intake manifold 12.

With reference to FIGS. 2 to 4, in the hose assembly with clamp 10, when a flexible rubber hose 14 and an outside fitting portion (forefront portion) 14a of the hose 14 are installed from the outside to a connecting pipe 11a (refer to FIG. 12) of the slot body 11, which is the other part, a clamp band 20 tightening the outside fitting portion 14a of the hose 14 and a band holder 30 holding the clamp band 20 are integrally assembled. In the embodiment shown in the figures, the clamp band 20 is used for the connected portion between the upstream end of the hose 14 and the duct 8.

The hose 14 is made of rubber and manufactured by an extrusion molding using, for example, acrylic rubber as a material. On the outer peripheral surface of the hose 14, a fiber layer is coated.

Figure 5A:
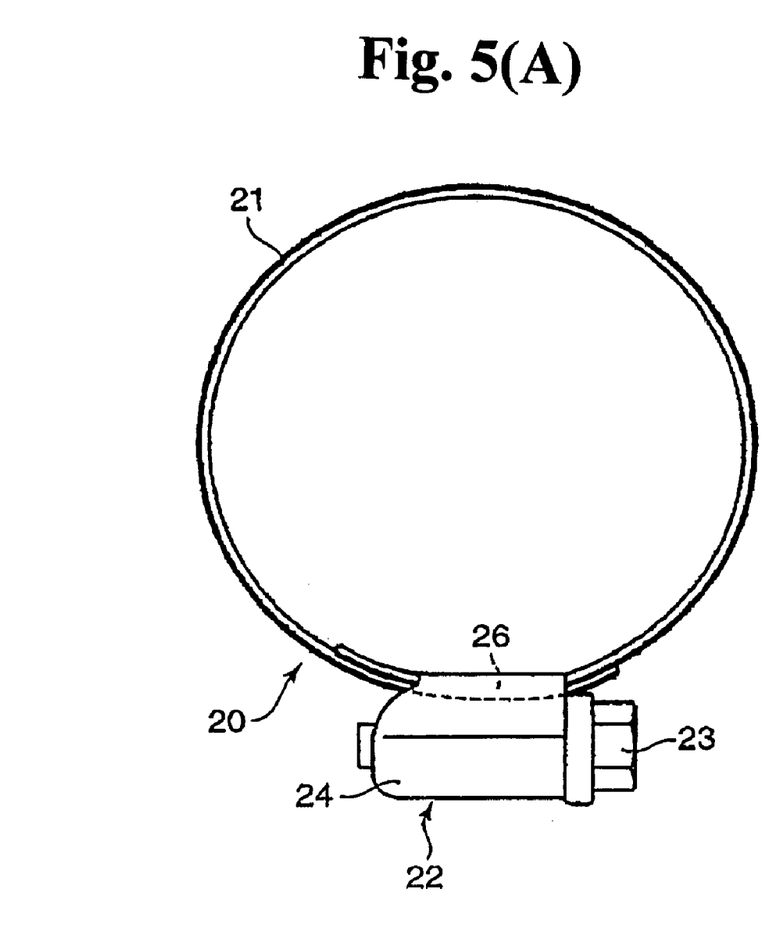
FIG. 5(A) is a front view.
Figure 5B:
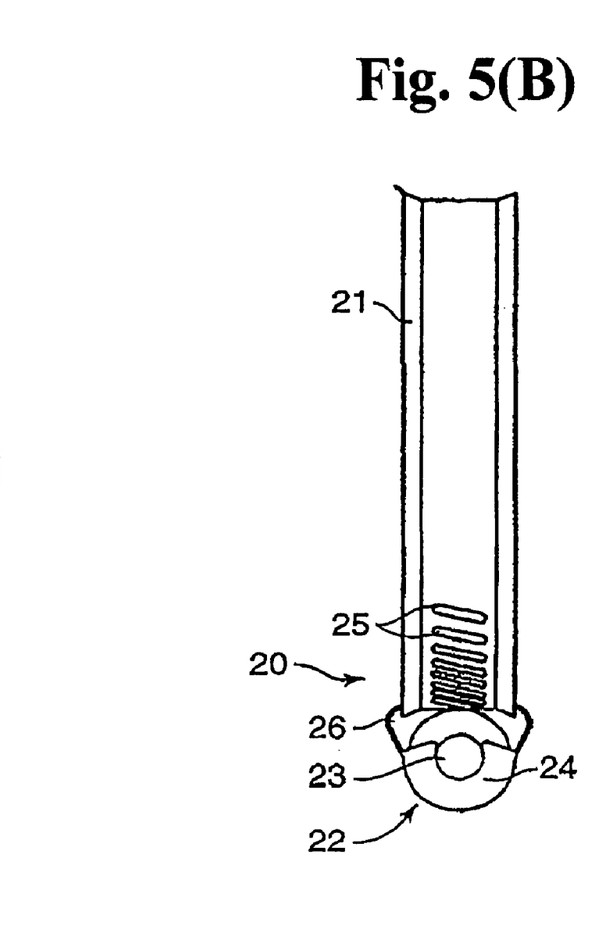
FIG. 5(B) is a side view.

FIGS. 5(A), 5(B) are overall views of a clamp band 20 according to the embodiment, wherein FIG. 5(A) is a front view, and FIG. 5(B) is a side view.

With reference to FIGS. 5(A), 5(B), the clamp band 20 includes a belt-like band portion 21 and a screw unit 22 provided at one end portion of the band portion 21. The screw unit 22 includes an endless screw 23 and a screw bearing 24 rotatably holding the endless screw 23. On the other hand, the outer peripheral surface of the band portion 21 forms inclined screwing portions 25 which are screwed into the endless screw 23. Moreover, the screw bearing 24 forms a through-bore 26 assuring the screwing between the endless screw 23 and the inclined screwing portions 25 by inserting the other end portion of the band portion 21. Then, by binding the band portion 21 around the outer periphery of the hose 14; inserting the other end portion of the band portion 21 into the through-bore 26; and rotating the endless screw 23, a clamp operation, in which the radius of the circular band portion 21 is shrank or expanded, can be conducted.

Figure 6:
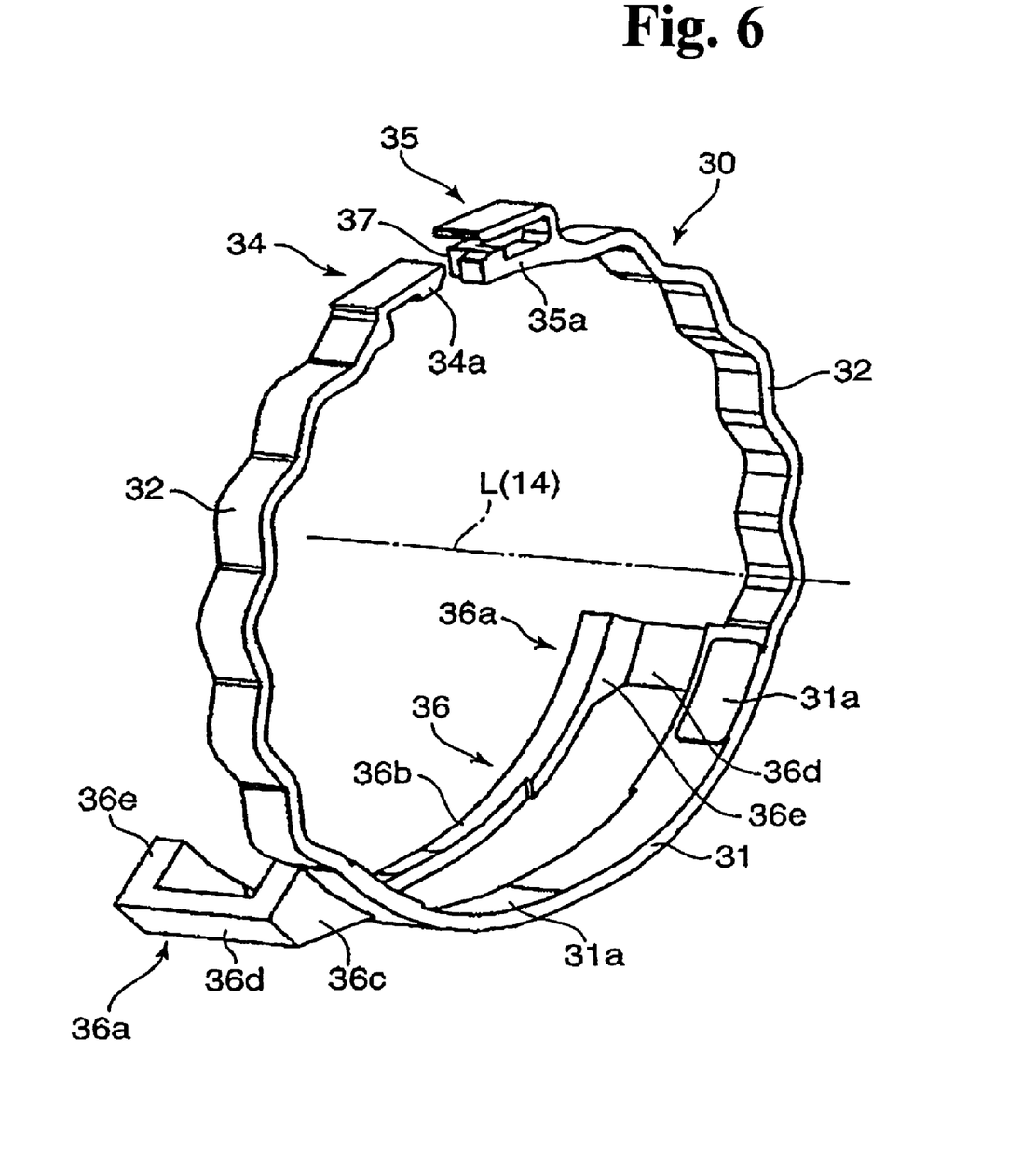
FIG. 6 is a perspective view of a band holder according to the embodiment.
Figure 7:
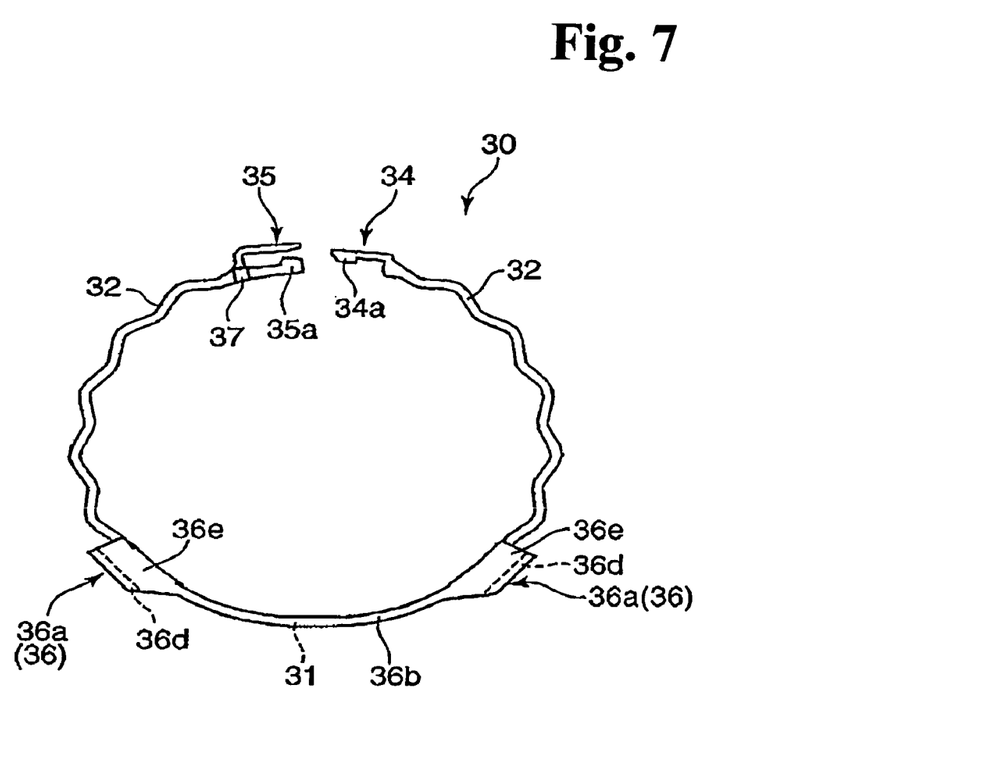
FIG. 7 is a schematic front view of the band holder.
Figure 8:
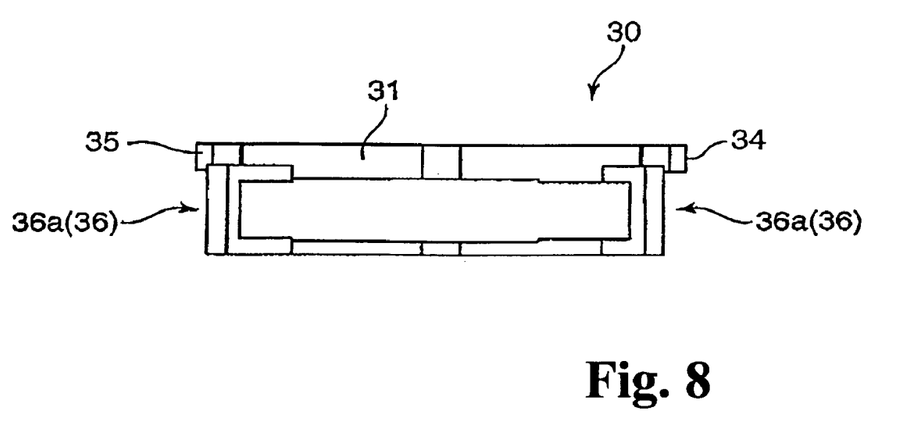
FIG. 8 is a bottom plan view of the band holder.
Figure 9:
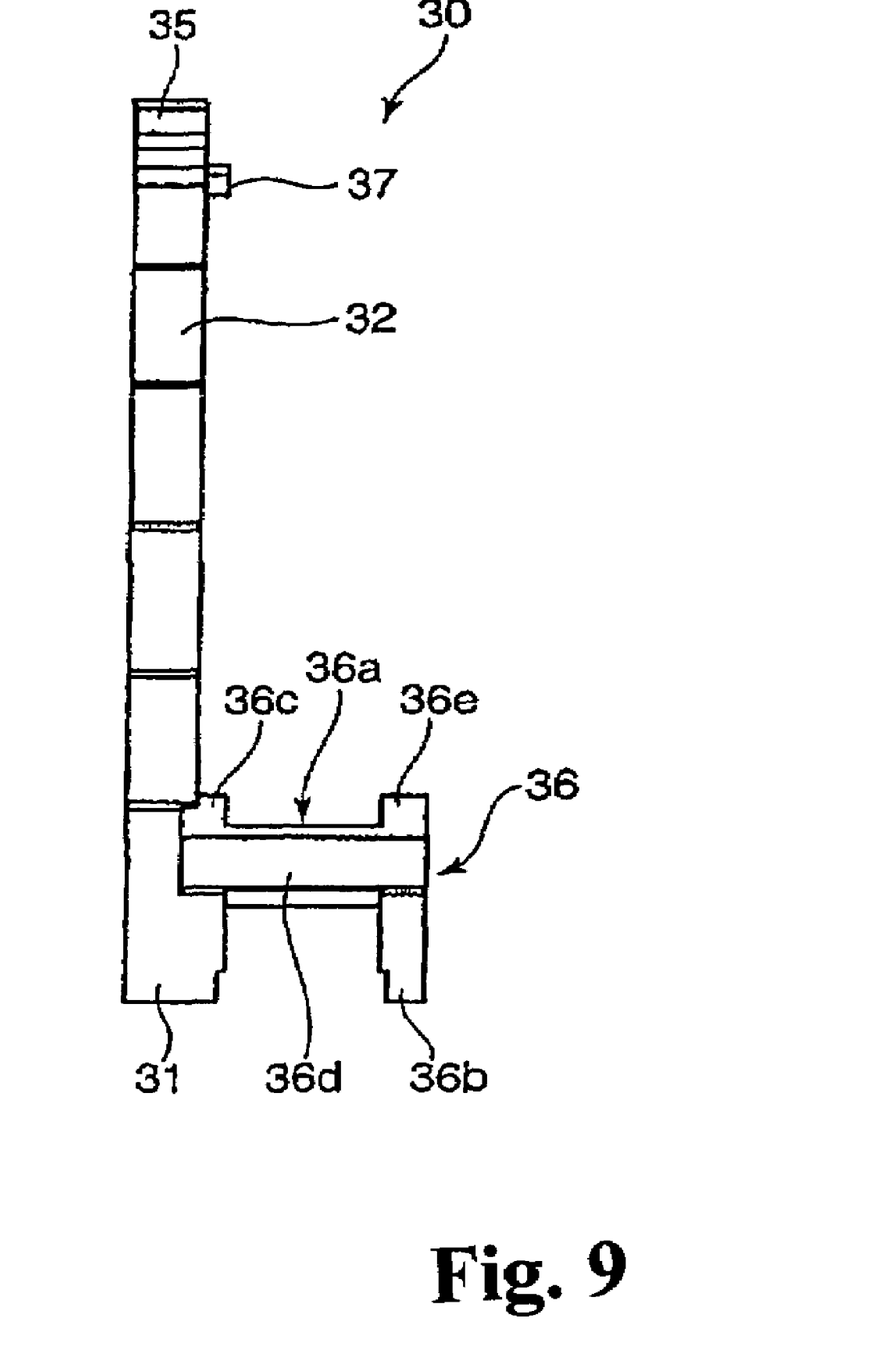
FIG. 9 is a side view of the band holder.

FIG. 6 is a perspective view of the band holder 30 according to the embodiment; FIG. 7 is a schematic front view of the band holder 30; FIG. 8 is a bottom plan view of the band holder 30; and FIG. 9 is a side view of the band holder 30.

With reference to FIGS. 6 to 8, the band holder 30 is totally a resin molded product made of nylon. The band holder 30 integrally includes a belt-like bottom portion 31 curved along the outer peripheral surface of the hose 14 (shown only by a central line L in FIG. 6); a pair of arm portions 32 continuously provided on both sides of the bottom portion 31; connecting portions 34, 35 which form a pair, are formed on free end portions of the respective arm portions 32, and connect both arm portions 32; and a holding portion 36 projecting from the bottom portion 31.

One part of the bottom portion 31 includes an undulating portion 31a (refer to FIG. 6) which undulates in a rectangle surface, and the bottom portion 31 is formed in such a way that the surface of the bottom portion 31 joints to the outer peripheral surface bottom portion of the hose 14.

The arm portions 32 are belt-like members connecting to the bottom portion 31 and bound to the outer peripheral portion of the hose 14 in such a way as to hold the hose 14. Each arm portion 32 is formed in a corrugated plate shape which undulates in a radius direction of the hose 14. Herewith, the arm portions 32 expand and contract in the radius direction of the hose 14 in a specified quantity. As a result, when the arm portions 32 are bound to the hose 14, the arm portions 32 are elastically attached on the outer periphery of the hose 14.

In the connecting portions 34, 35, a male-type projection 34a provided at one side of the arm portions 32 is fitted into a female-type engaging portion 35a provided at the other side of the arm portions 32, and both projection and engaging portions are tightened. As a result, both arm portions 32 are integrally connected.

The holding portion 36 integrally includes a pair of through-band portions 36a respectively projecting from one end side and the other end side of the bottom portion 31; and a reinforcing portion 36b connecting both through-band portions 36a. The through-band portions 36a have a supporting structure which opens like a channel. Each through-band portion 36a integrally includes a base wall portion 36c outwardly projecting in a radius direction from one side of the surface of the bottom portion 31; a top portion 36d horizontally extending from the outside of the radius direction of the base wall portion 36c; and an end wall portion 36e projecting to the inside of the radius direction from the free end of the top portion 36d and facing the base wall portion 36c. During assembly, the band portion 21 of the clamp band 20 is placed along between both wall portions 36c, 36e, so that in a state where the clamp operation of the band portion 21 of the clamp band 20 is possible, displacement of the clamp band 20 in a direction of the central line L of the hose can be controlled.

With reference to FIGS. 7, 9, at the connecting portion 35 forming the female engaging portion 35a, a positioning projection 37, which positions the clamp band 20 to the holding position 36, projects.

Figure 10:
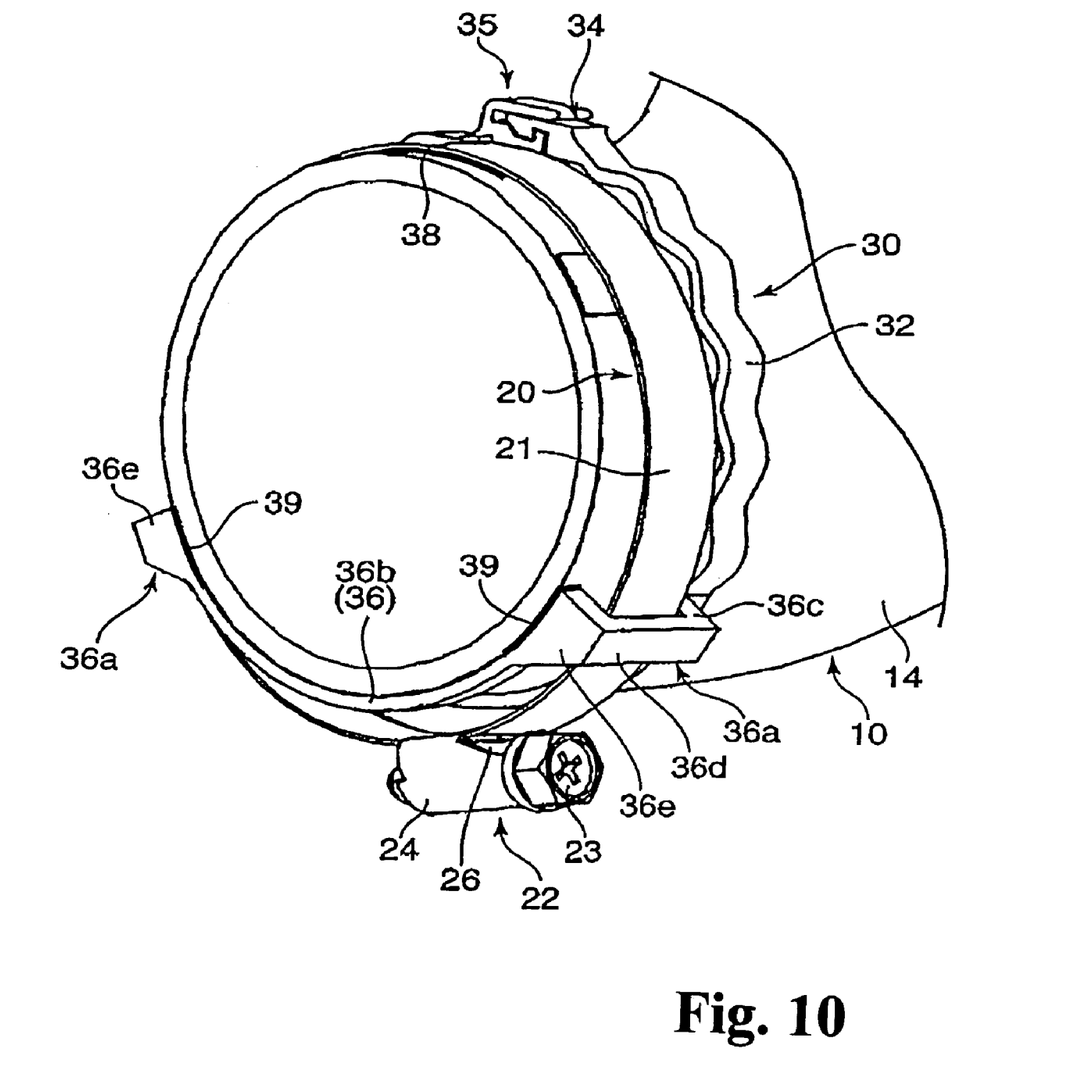
FIG. 10 is a perspective view of essential parts of the hose assembly with clamp according to the embodiment.
Figure 11:
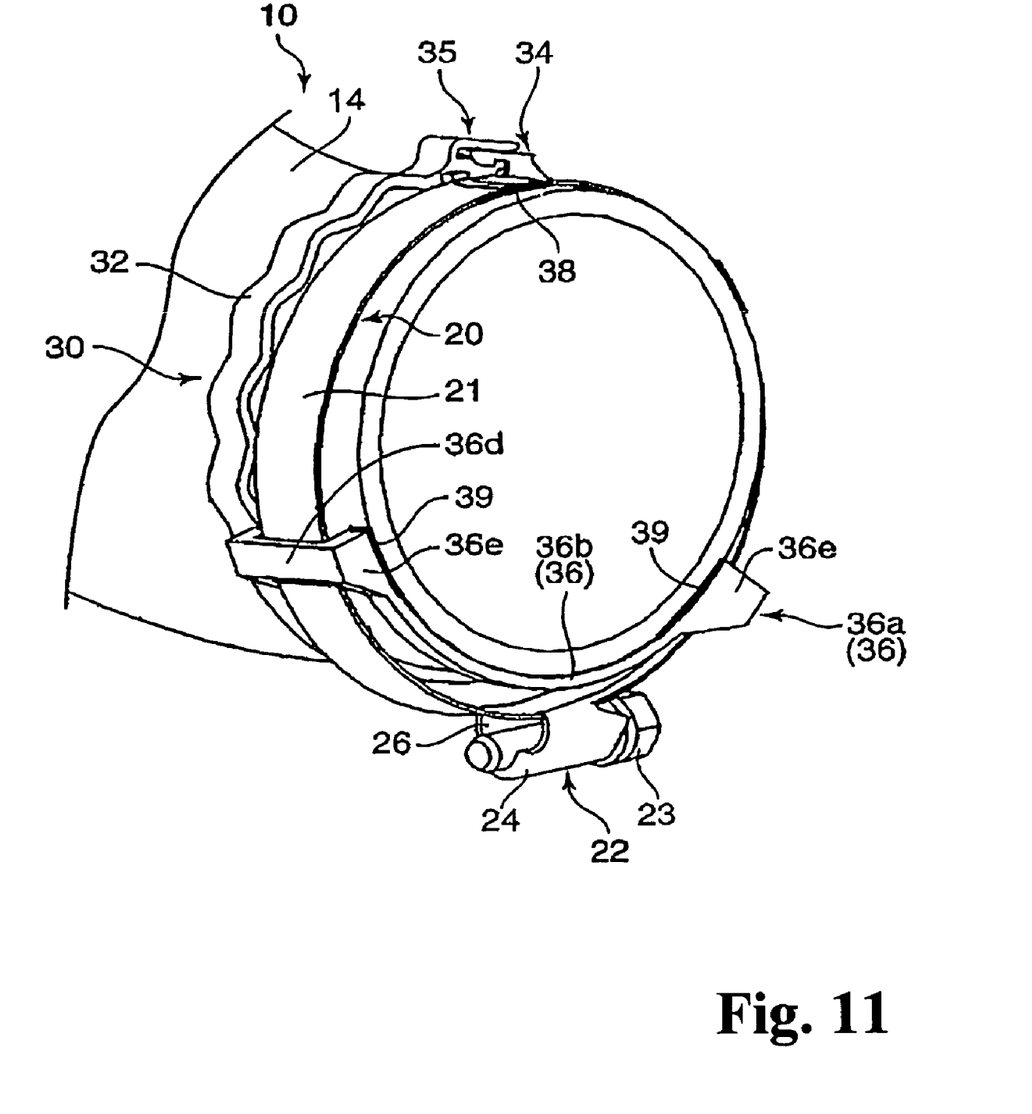
FIG. 11 is a perspective view of the essential parts of the hose assembly with clamp according to the embodiment.
Figure 12:
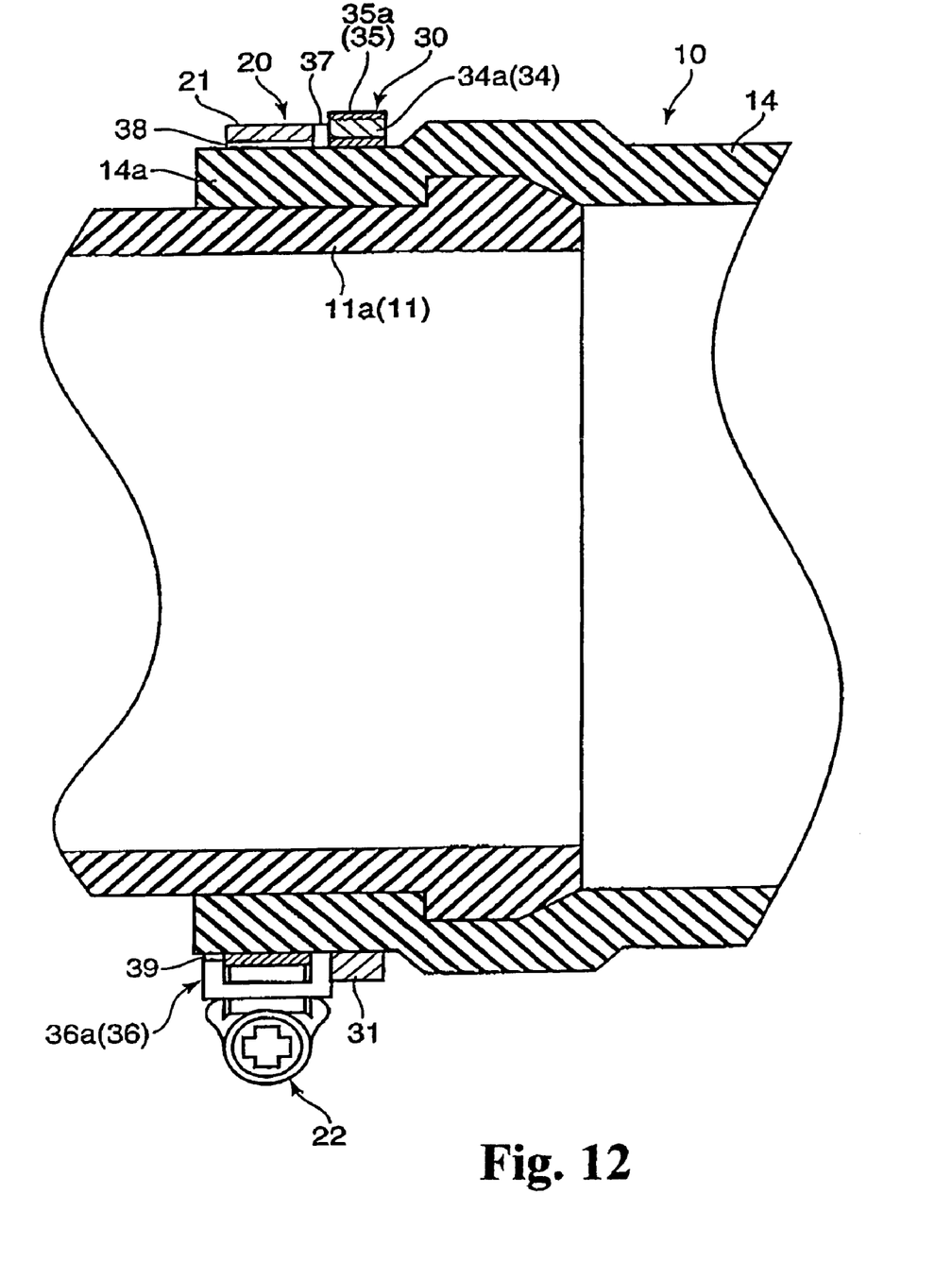
FIG. 12 is a schematic sectional view showing a fitting structure of the hose assembly with clamp.

FIGS. 10, 11 are perspective views showing essential parts of the hose assembly with clamp 10 according to the embodiment, and FIG. 12 is a schematic sectional view showing a fitting structure of the hose assembly with clamp 10.

With reference to each figure, in the clamp band 20 and the band holder 30, at first, the clamp band 20 is bound to the hose 14 and the screw unit 22 of the clamp band 20 is positioned at the bottom of the hose 14. The band holder 30 is bound to the hose 14 in such a way that each through-band portion 36a positions the band portion 21 on both sides of the screw unit 22. The arm portions 32 of the band holder 30 are connected at the connecting portions 34, 35, and attached to the hose, so that the assembly is completed.

In the embodiment, when the clamp band 20 is attached, the middle portion of the band portion 21 is bonded to the outer periphery of the hose 14 by an adhesive. When the band holder 30 is attached, the through-band portion 36a comprised in the holding portion 36 is bonded to the outer periphery of the hose 14 by the adhesive. In FIGS. 10-12, the reference numeral 38 represents an adhesion layer formed between the outer periphery portion of the hose 14 and the middle portion of the band portion 21, and the reference numeral 39 represents an adhesion layer formed between the outer periphery portion of the hose 14 and the holding portion 36. In the embodiment, the adhesion layer 39 includes fixing means for fixing at least the holding portion 36 to the hose 14.

In the above-mentioned embodiment, the band holder 30 holding the clamp band 20 is provided in the hose 14 as a separate member from the hose 14, so that even in the hose 14 which is manufactured by the extrusion molding, the clamp band 20 can be held without providing a special molding process to the hose 14 by itself. Also, the band holder 30 binds the arm portion 32 to the hose 14 and connects the free ends of the arm portions 32 by the connecting portions 34, 35, so that the band holder 30 can be easily assembled to the hose 14. In addition, the holding portion 36 which projects from the arm portion 32 prevents the clamp band 20 from being displaced in the direction of the central line L of the hose 14, so that the clamp band 20 can be reliably prevented from displacement or disengagement in a state wherein the clamp operation of the clamp band 20 is possible. Moreover, at least the holding portion 36 is fixed to the hose 14 by the adhesion layer 39 as the fixing means, so that the band holder 30 by itself can be prevented from disengagement or displacement, and the clamp band 20 can be held more reliably.

In the embodiment, the band holder 30 is placed on an inner back side of the clamp band 20 in the direction of the central line L of the hose 14. Therefore, in this embodiment, as shown in FIG. 12, the clamp band 20 can be placed on the tip of the hose 14 as close as possible. As a result, the clamp in the direction of the central line L of the hose 14 can be set as short as possible, and an extra built-in operation can be omitted.

In the embodiment, the band holder 30 is made of a resin molded product, and the arm portion 32 is elastically bound to the hose 14. Therefore, in the embodiment, the band holder 30 can be fixed to the outer periphery of the hose 14 by a necessary and sufficient tightening force. More specifically, in the case where the band holder 30 is fixed to the flexible hose 14 by an overly strong tightening force, while a holding force of the clamp band 20 increases, an operation, wherein the hose 14 is installed from the outside to the connecting pipe 11a, becomes difficult. On the other hand, if a tightening force of the band holder 30 is too weak, capabilities to hold the band holder 30 by itself become weak. Therefore, by elastically binding the arm portion 32 to the outer periphery of the hose 14, the band holder 30 can be attached to the hose 14 by the necessary and sufficient tightening force.

In the embodiment, the arm portion 32 is formed in a corrugated plate shape in such a way of undulating in the radius direction viewed from the direction of the central line L of the hose 14. Therefore, in the embodiment, the band holder 30 can be manufactured by a relatively simple molding technology.

In the embodiment, the middle portion of the band portion 21 is attached to the hose 14 with the adhesion layer 38. Therefore, in the embodiment, the screw unit 22 of the clamp band 20 is prevented from being displaced in a circumferential direction of the hose 14, and even under a less-visible operational environment, the screw unit 22 of the clamp band 20 can be accurately operated.

In the embodiment, the fixing means is the adhesion layer 39 formed between the surface of the hose 14 and the band holder 30. Therefore, in the embodiment, the fixing means can be completed by the adhesive, so that the hose 14 can be easily attached and also the band holder 30 can improve the capabilities to hold.

In the embodiment, the holding portion 36 includes the through-band portions 36a which form a pair in a position to hold both sides of the screw unit 22 of the band portion 21 during the assembly. Therefore, in the embodiment, the pair of through-band portions 36a can prevent the screw unit 22 of the clamp band 20 from being displaced in the circumferential direction, so that the clamp operation under the less-visible operational environment is facilitated.

The above-mentioned embodiment is only a preferred operative example of the invention and this invention is not limited to the embodiment described above. Hereunder, another embodiment of the invention will be explained. Incidentally, in the following explanation, members same as those in the aforementioned embodiment are designated by the same reference numerals and explanations thereof are omitted.

Figure 13:
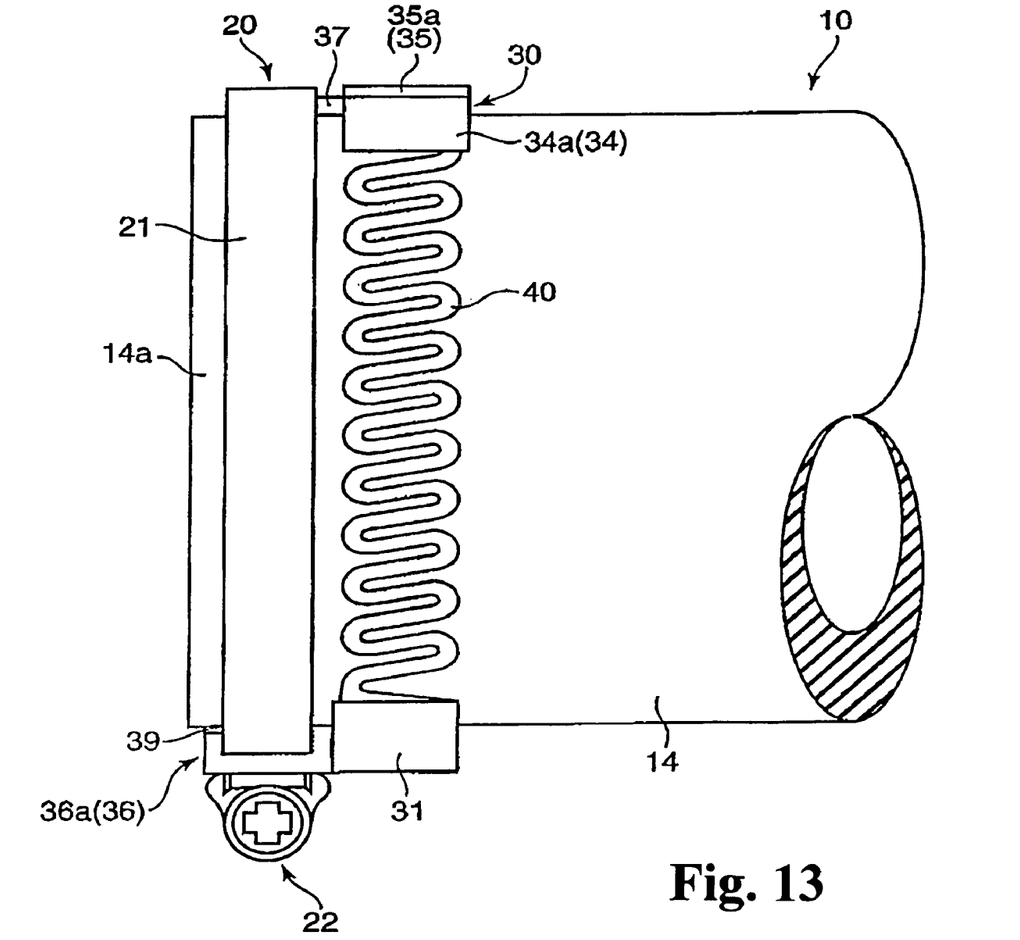
FIG. 13 is a partial side view of the hose assembly with clamp according to another embodiment of the invention.

FIG. 13 is a partial side view of the hose assembly with clamp 10 according to another embodiment of the invention.

With reference to FIG. 13, in the embodiment, arm portions 40 formed in a shape which meanders in the direction of the central line L of the hose 14 are used. Base end portions and free end portions of the arm portions 40 are fixed to the base portion of the respective bottom portion 31 and the connecting portions 34 (35), and the arm portions 40 are retractable along the circumferential direction of the hose 14.

Even in the case wherein the embodiment in FIG. 13 is applied, the band holder 30 can be fixed to the outer periphery of the hose 14 by the necessary and sufficient tightening force using a relatively simple molding technology.

Figure 14:
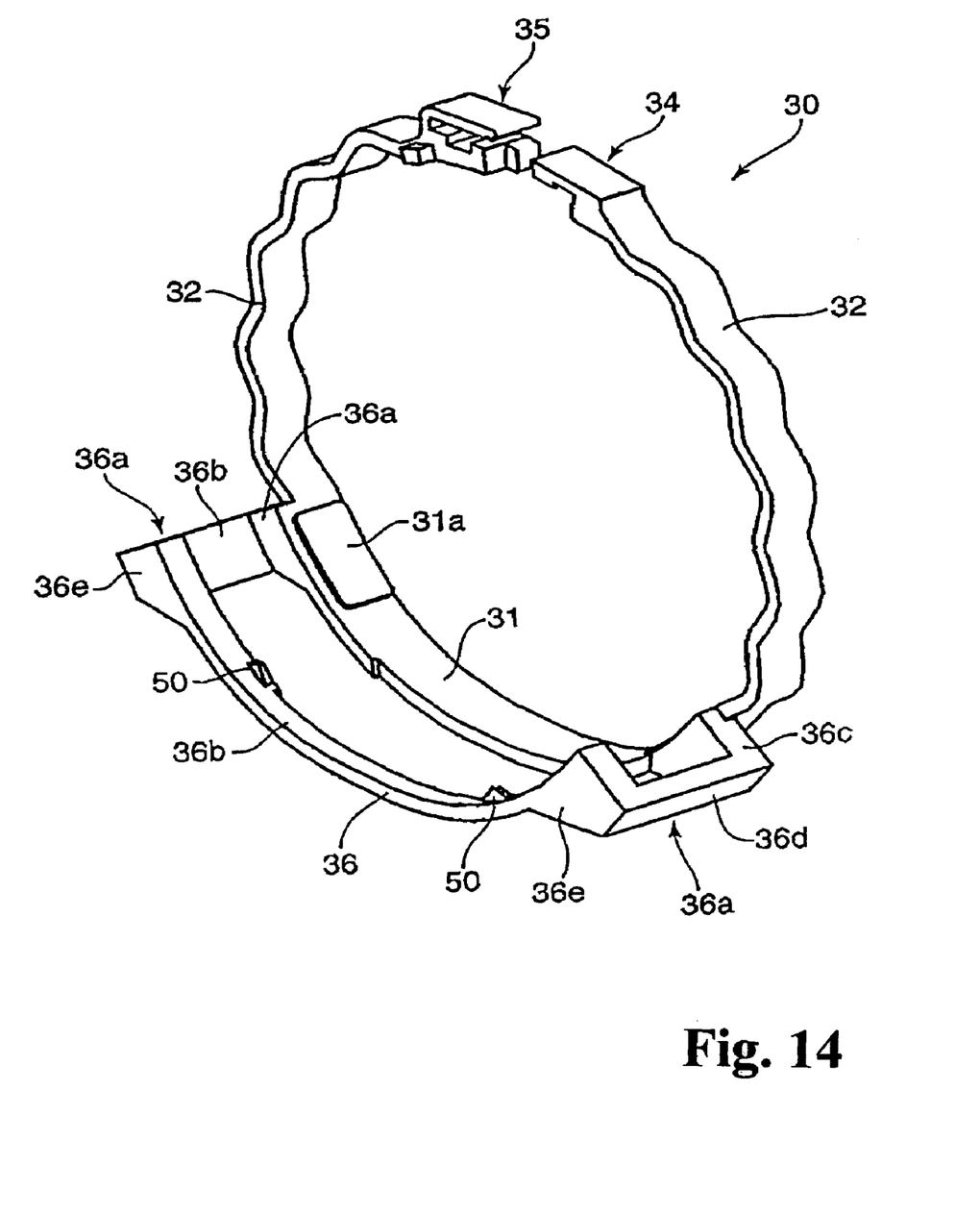
FIG. 14 is a perspective view showing the band holder according to another embodiment of the invention.

FIG. 14 is a perspective view showing the band holder 30 according to another embodiment of the invention.

With reference to FIG. 14, the band holder 30 according to the embodiment shown in the figure provides projections 50 as the fixing means for fixing the holding portion 36 to the hose 14. The projections 50 are provided near the through-band portions 36a in the inner peripheral portion of the reinforcing portion 36b and project to the inside of the radius direction of the hose 14.

In the embodiment in FIG. 14, when the band holder 30 is attached to the hose 14, the projections 50 enter the surface of the hose 14, so that by attaching the band holder 30, the capabilities of the band holder 30 to hold the hose 14 can be improved. As a result, without providing a special operation for holding the hose 14, the band holder 30 can be positioned using the flexibility of the hose 14.

Incidentally, the present invention is most preferred as an intake hose which is connected to the upstream side of a throttle valve 11. However, the invention is not limited to the intake hose, and can be applied to, for example, a hose 5 on a turbocharger 3 side in FIG. 1. Also, the invention can be variously modified within a range that it does not exceed claims of the present invention.

The disclosure of Japanese Patent Application No. 2007-037730, filed on Feb. 19, 2007, is incorporated in the application.

While the invention has been explained with reference to the specific embodiments of the invention, the explanation is illustrative and the invention is limited only by the appended claims.

What is claimed is:

1. A band holder for holding a clamp band for a hose, comprising:
    an arm for covering an outer peripheral portion of the hose, said arm portion having free ends,
    connecting portions provided at the free ends of the arm for connecting the free ends to form a circular shape of the arm,
    a holding portion projecting from the arm for holding the clamp band, and
    fixing means for fixing at least the holding portion to the hose,
    wherein the arm has a corrugated plate shape so that the arm undulates radially.

2. A band holder according to claim 1, wherein the band holder is formed of a resin molded product, and has an elasticity for holding the hose.

3. A band holder according to claim 1, wherein the holding portion is provided in a middle of the arm.

4. A band holder according to claim 1, wherein the fixing means is an adhesive for fixing the band holder to a surface of the hose.

5. A band holder according to claim 1, wherein the fixing means is a projection projecting radially inwardly from the holding portion.

6. A band holder according to claim 1, wherein the holding portion includes a pair of through-band portions spaced apart from each other and facing inwardly of the band holder for holding two sides of a screw unit of the clamp band.

7. A band holder according to claim 6, wherein the arm includes two arm portions, and a bottom portion attached to the two arm portions, the holding portion projecting laterally from the bottom portion.

8. A band holder according to claim 7, wherein the holding portion further includes a reinforcing portion extending between the through-band portions at a side opposite to the bottom portion.

9. A hose assembly comprising:
    the band holder according to claim 1,
    a flexible hose to be connected to a tubular member, and
    a clamp band covering an outer surface of the hose for connecting the hose to the tubular member, the clamp band including a band portion, and a screw unit provided at ends of the band portion for a clamp operation so that the screw unit tightens the band portion.

10. A hose assembly according to claim 9, wherein the clamp band is situated closer to the hose than the band holder in a radial direction.

11. A band holder for holding a clamp band for a hose, comprising:
    an arm for covering an outer peripheral portion of the hose, said arm portion having free ends,
    connecting portions provided at the free ends of the arm for connecting the free ends to form a circular shape of the arm,
    a holding portion projecting from the arm for holding the clamp band, and
    fixing means for fixing at least the holding portion to the hose,
    wherein the arm comprises meandering portions stretchable and retractable in a circumferential direction of the hose.

12. A band holder according to claim 11, wherein each meandering portion is formed by an elongated member corrugating in an axial direction of the hose and extending along the circumferential direction of the hose.

* * * * *